US011777999B2

(12) United States Patent
Nakano

(10) Patent No.: US 11,777,999 B2
(45) Date of Patent: Oct. 3, 2023

(54) VOICE COMMUNICATION SYSTEM AND REDUNDANCY METHOD FOR CALL CONTROL SERVER

(71) Applicant: ICOM INCORPORATED, Osaka (JP)

(72) Inventor: Akira Nakano, Osaka (JP)

(73) Assignee: ICOM INCORPORATED, Osaka (JP)

( * ) Notice: Subject to any disclaimer, the term of this patent is extended or adjusted under 35 U.S.C. 154(b) by 256 days.

(21) Appl. No.: 17/438,453

(22) PCT Filed: Jan. 23, 2020

(86) PCT No.: PCT/JP2020/002324
§ 371 (c)(1),
(2) Date: Sep. 12, 2021

(87) PCT Pub. No.: WO2020/189003
PCT Pub. Date: Sep. 24, 2020

(65) Prior Publication Data
US 2022/0159045 A1 May 19, 2022

(30) Foreign Application Priority Data
Mar. 15, 2019 (JP) .................. 2019-048650

(51) Int. Cl.
*H04M 1/24* (2006.01)
*H04M 3/08* (2006.01)
(Continued)

(52) U.S. Cl.
CPC ...... *H04L 65/1046* (2013.01); *H04L 41/0668* (2013.01); *H04L 43/0811* (2013.01); *H04L 65/1069* (2013.01)

(58) Field of Classification Search
CPC ............. H04L 65/1046; H04L 41/0668; H04L 43/0811; H04L 65/1069
See application file for complete search history.

(56) References Cited

U.S. PATENT DOCUMENTS 5,852,724 A 12/1998 Glenn
7,319,701 B2 * 1/2008 Guven ...................... H04L 1/08
370/401
(Continued)

FOREIGN PATENT DOCUMENTS

CN 101312431 A 11/2008
CN 102057658 A 5/2011
(Continued)

OTHER PUBLICATIONS

The extended European search report for the corresponding EP application No. 20772621.7 dated Nov. 24, 2022.
(Continued)

*Primary Examiner* — Simon King
(74) *Attorney, Agent, or Firm* — Muncy, Geissler, Olds & Lowe, P.C.

(57) ABSTRACT

Provided is a server system robust against a communication path failure. A first server system 2-1 and a second server system 2-2 are respectively installed on a first network 3-1 and a second network 3-2 provided by common carriers different from each other. The first and second server systems are connected to each other by a dedicated line 6. Even when a failure occurs in the first network, communication through the second network can be maintained, and even when a failure occurs in the second network, communication through the first network can be maintained. Further, when a failure occurs in the dedicated line, operations can be performed within each of the first and second networks in a degeneracy mode.

20 Claims, 31 Drawing Sheets

(51) Int. Cl.
*H04M 3/22* (2006.01)
*H04L 65/1046* (2022.01)
*H04L 41/0668* (2022.01)
*H04L 43/0811* (2022.01)
*H04L 65/1069* (2022.01)

(56) References Cited

U.S. PATENT DOCUMENTS

| | | | |
|---|---|---|---|
| 7,830,813 B1 * | 11/2010 | Lo | G06F 11/3447 370/254 |
| 7,912,075 B1 * | 3/2011 | Holland | H04L 65/80 370/216 |
| 2004/0042485 A1 * | 3/2004 | Gettala | H04L 67/1001 370/465 |
| 2007/0123288 A1 * | 5/2007 | Hofbauer | H04M 3/42348 455/518 |
| 2008/0064391 A1 | 3/2008 | Cal | |
| 2008/0239964 A1 | 10/2008 | Mitsutake | |
| 2011/0085470 A1 * | 4/2011 | Park | H04L 65/1069 370/254 |
| 2011/0125910 A1 | 5/2011 | Sueda | |
| 2016/0269546 A1 | 9/2016 | Matsushima | |
| 2017/0332228 A1 | 11/2017 | Oda | |

FOREIGN PATENT DOCUMENTS

| | | |
|---|---|---|
| CN | 105706430 A | 6/2016 |
| CN | 106688223 A | 5/2017 |
| JP | 2004-072256 A | 3/2004 |
| JP | 2005-348143 A | 12/2005 |
| JP | 2007318629 A | 12/2007 |
| JP | 2009246475 A | 10/2009 |
| JP | 2015-153259 A | 8/2015 |

OTHER PUBLICATIONS

Office Action of the corresponding CN application No. 202080018402.8 dated Apr. 26, 2023 and English translation thereof.

* cited by examiner

Fig. 7A

| | |
|---|---|
| PROCESS UNDER EXECUTION | B2-1 |
| OPERATION SETTING | main |
| OPERATION MODE | active |
| OPERATION NOTIFICATION EXPIRATION DATE AND TIME | 2019.2.18. ..** |
| ACTIVE PROCESS OPERATION NOTIFICATION EXPIRATION DATE AND TIME | — |

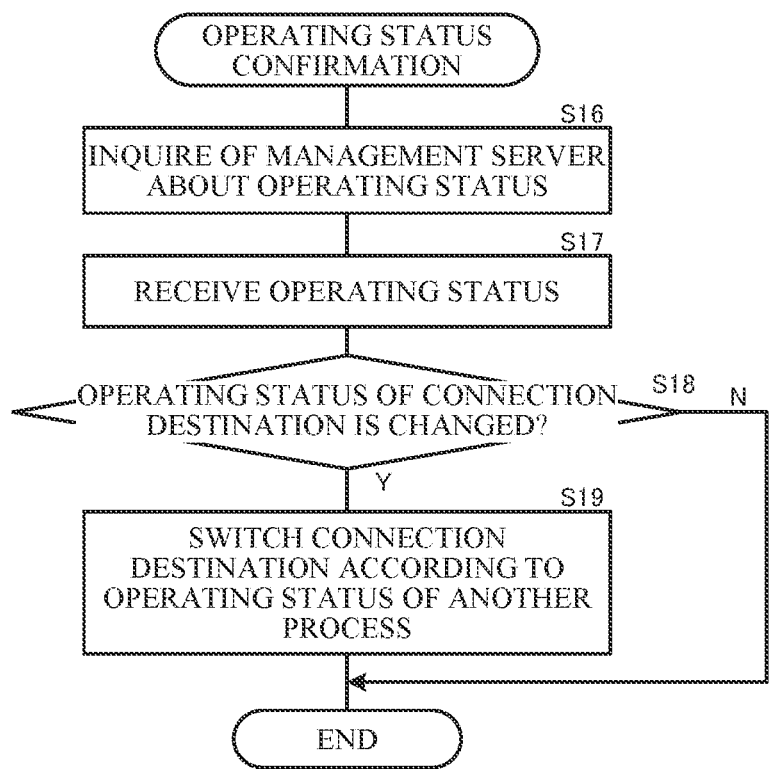

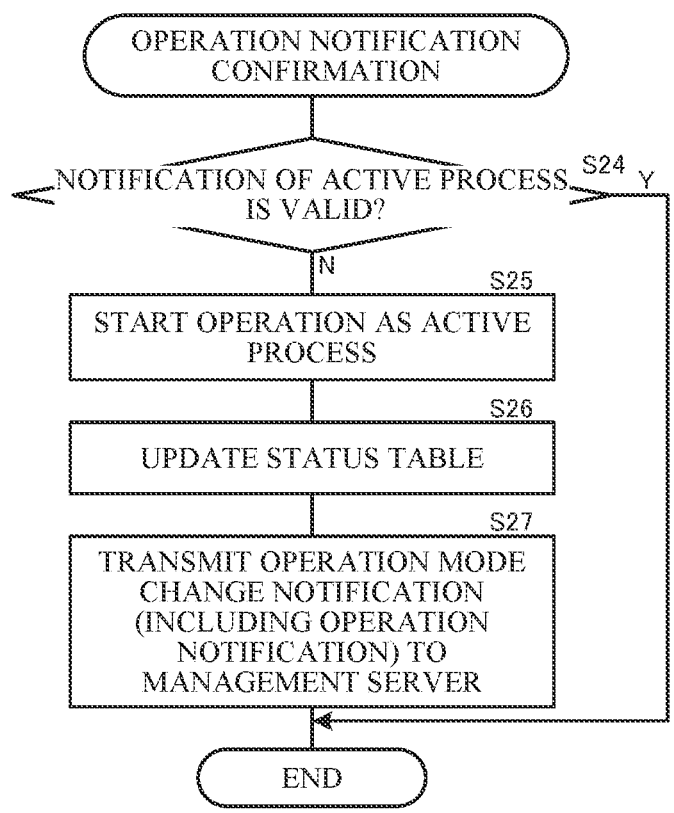

| CALL CONTROL SERVER 1 PROCESS NAME | OPERATION NOTIFICATION EXPIRATION DATE AND TIME | OPERATION SETTING | OPERATION MODE |
|---|---|---|---|
| A-1 | 2019.2.18. ..** | main | active |
| B1-1 | 2019.2.18. ..** | main | active |
| B2-1 | 2019.2.18. ..** | main | active |
| C-1 | 2019.2.18. ..** | alone | active |
| idle | — | — | idle |
| Br-1 | 2019.2.18. ..** | main | active |

| CALL CONTROL SERVER 2 PROCESS NAME | OPERATION NOTIFICATION EXPIRATION DATE AND TIME | OPERATION SETTING | OPERATION MODE |
|---|---|---|---|
| A-2 | 2019.2.18. ..** | sub | standby |
| B1-2 | 2019.2.18. ..** | sub | standby |
| B2-2 | 2019.2.18. ..** | sub | standby |
| idle | — | — | idle |
| idle | — | — | idle |
| Br-2 | 2019.2.18. ..** | sub | standby |

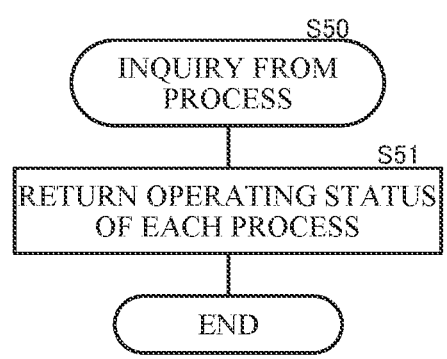

Fig. 11A

| CALL CONTROL SERVER 1 | OPERATION MODE | OPERATION MODE | CALL CONTROL SERVER 2 |
|---|---|---|---|
| A-1 | active | standby | A-2 |
| B1-1 | active | standby | B1-2 |
| B2-1 | down | active | B2-2 |
| C-1 | active | idle | idle |
| idle | idle | idle | idle |
| Br-1 | active | standby | Br-2 |

Fig. 11B

| CALL CONTROL SERVER 1 | OPERATION MODE | OPERATION MODE | CALL CONTROL SERVER 2 |
|---|---|---|---|
| A-1 | active | standby | A-2 |
| B1-1 | active | standby | B1-2 |
| B2-1 | active | standby | B2-2 |
| C-1 | active | idle | idle |
| idle | idle | idle | idle |
| Br-1 | down | active | Br-2 |

Fig. 12

| MAIN PROVISIONING SERVER ADDRESS | ACTIVE FLAG |
|---|---|
| SUB-PROVISIONING SERVER ADDRESS | ACTIVE FLAG |
| MAIN CALL CONTROL SERVER ADDRESS | ACTIVE FLAG |
| SUB-CALL CONTROL SERVER ADDRESS | ACTIVE FLAG |

| VARIOUS TYPES OF SETTING INFORMATION |
|---|

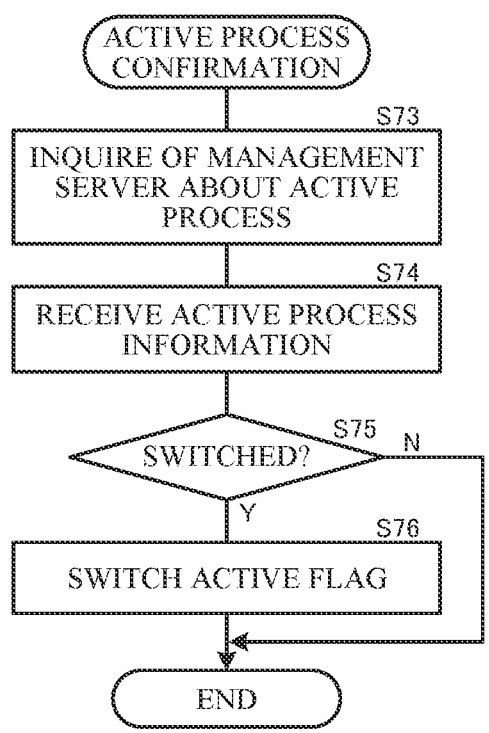

Fig. 15A (A): MANAGEMENT SERVER 1

| CALL CONTROL SERVER 1 | OPERATION MODE | OPERATION MODE | CALL CONTROL SERVER 2 |
|---|---|---|---|
| A-1 | active | down | A-2 |
| B1-1 | active | down | B1-2 |
| B2-1 | active | down | B2-2 |
| C-1 | active | idle | idle |
| idle | idle | idle | idle |
| Br-1 | active | down | Br-2 |

Fig. 15B (B): MANAGEMENT SERVER 2

| CALL CONTROL SERVER 1 | OPERATION MODE | OPERATION MODE | CALL CONTROL SERVER 2 |
|---|---|---|---|
| A-1 | down | active | A-2 |
| B1-1 | down | active | B1-2 |
| B2-1 | down | active | B2-2 |
| C-1 | down | idle | idle |
| idle | idle | idle | idle |
| Br-1 | down | active | Br-2 |

VOICE COMMUNICATION SYSTEM AND REDUNDANCY METHOD FOR CALL CONTROL SERVER

TECHNICAL FIELD

The present disclosure relates to a voice communication system controlling voice communication performed through a network and particularly relates to providing redundancy for a server system thereof.

BACKGROUND ART

When providing redundancy for a server system, it is common to construct an environment in which servers and communication paths are multiplexed, and one is set as active and the other is set as standby. Such a redundant system can be installed on a cloud (see Patent Literature 1).

CITATION LIST

Patent Literature

Patent Literature 1: Unexamined Japanese Patent Application Publication No. 2015-153259

SUMMARY OF INVENTION

Technical Problem

However, in a case of a service provided by a single common carrier, server switching from an active side to a standby side may not be expected when a failure occurs across the entire communication path, and therefore there is concern for robustness.

An objective of the present disclosure is to provide a voice communication system robust to a failure in part of servers in a server system and a communication path failure, and a method of providing call control server redundancy.

Solution to Problem

A voice communication system according to the present disclosure includes a first server system installed on a first network and a second server system installed on a second network separated from the first network. The first and second server systems are connected to each other by a communication line different from the networks. The first server system includes a first call control server, and the second server system includes a second call control server. The first call control server and the second call control server execute, in parallel, a call control process controlling voice communication between a plurality of communication terminals connected to the first and second networks. A signal of a communication terminal in voice communication is transferred between communication terminals through the first and second networks and the communication line. The first and second networks may be closed networks provided by common carriers different from each other, respectively.

A method of providing call control server redundancy according to the present disclosure causes, in a voice communication system including a first server system being installed on a first network and including a first call control server, a second server system being installed on a second network and including a second call control server, and a communication line connecting the first call control server to the second call control server and being different from the networks, each server to perform the following operations. During normal operation when communication through the communication line can be performed, the method causes the first server to operate in an active mode actually providing call control service and causes the second server to operate in a standby mode that, when a first server in the active mode goes down, becomes an active mode in place of the first server. During a failure when the communication line is down, the method causes the second call control server to operate in an active mode along with the first call control server.

Server redundancy is provided by installing server systems on different networks and connecting the systems by a communication line (dedicated line) such as a VPN. Consequently, a communication function can be secured even when one network completely fails.

Communication terminals include a first communication terminal connectable to a first network and a second communication terminal connectable to a second network; and the first communication terminal can access the first call control server through the first network and can access the second call control server through the first network and the communication line. The second communication terminal can access the second call control server through the second network and can access the first call control server through the second network and the communication line. Out of the first call control server and the second call control server executing the call control process in parallel, one call control server operates in an active mode actually controlling voice communication (active server), and the other call control server operates in a standby mode that, when a call control server in the active mode does not operate normally, becomes an active mode in place of the call control server not operating normally (standby server). An active server periodically transmits an operation notification being a message notifying that the active server is operating normally, to a standby server being a call control server in the standby mode through the communication line. The standby server maintains the standby mode while periodically receiving the operation notification. The communication terminal accesses a call control server in the active mode and performs voice communication with another communication terminal.

Even when server systems are installed on different networks, voice signals can be exchanged through the communication line, and therefore a redundant configuration in which a call control server in one server system is set as an active server and a call control server in the other server system as a standby server can be provided.

When communication between the first and second server systems is interrupted due to a communication line failure, the active server maintains an active mode, and the standby server switches the operation mode of the standby server to an active mode and starts controlling voice communication. In other words, both operate in the active mode. A communication terminal connected to a network on the active server side accesses the active server and performs voice communication with another communication terminal accessing the same active server. On the other hand, a communication terminal connected to a network on the standby server side accesses the standby server entering an active mode and performs voice communication with another communication terminal accessing the standby server entering the active mode.

When the communication line connecting the server systems fails, communications within the first network and within the second network can be maintained by causing both the first call control server and the second call control server to operate in an active mode.

The first server system further includes a first management server, and the second server system further includes a second management server. Each of the first management server and the second management server includes a management table storing operating status of the first and second call control servers. Each of the first call control server and the second call control server periodically transmits an operation notification to the first management server and the second management server. Further, each of the first call control server and the second call control server transmits, when switching an operation mode of the call control server from a standby mode to an active mode, a mode switch notification being a message notifying the switching, to the first management server and the second management server. Each of the first management server and the second management server stores, into the management table, operating status of each call control server acquired by the operation notification and the mode switch notification, that is, status including which call control server is in an active mode. The communication terminal inquires of a management server on a network to which the communication terminal is connected about which of a first call control server and a second call control server is an active server and accesses a returned call control server.

Installing a management server facilitates a search for an active server by a communication terminal. Further, by installing a management server in each of two server systems, even when a communication line is blocked, communication terminals connected to both networks can make inquiries to a management server on each side.

Advantageous Effects of Invention

By respectively installing a first and second server systems on first and second networks different from each other, the present disclosure can enhance robustness against a server failure and a communication path failure.

BRIEF DESCRIPTION OF DRAWINGS

FIG. 7A is a diagram illustrating a status table provided in a main process;

FIG. 8B is a flowchart illustrating an operation of the call control server;

FIG. 8D is a flowchart illustrating an operation of the call control server;

FIG. 9 is a diagram illustrating a management table 310 provided in a management server;

FIG. 10D is a flowchart illustrating an operation of the management server;

FIG. 11A is a diagram describing stored contents of the management table when part of the processes goes down;

FIG. 11B is a diagram describing stored contents of the management table when part of the processes goes down;

FIG. 12 is a diagram illustrating an example of provisioning data set to the communication terminal;

FIG. 13C is a flowchart illustrating an operation of the communication terminal;

FIG. 15A is a diagram describing stored contents of a first management table when the VPN connecting the server systems goes down;

FIG. 15B is a diagram describing stored contents of a second management table when the VPN connecting the server systems goes down;

DESCRIPTION OF EMBODIMENTS

Figure 1:
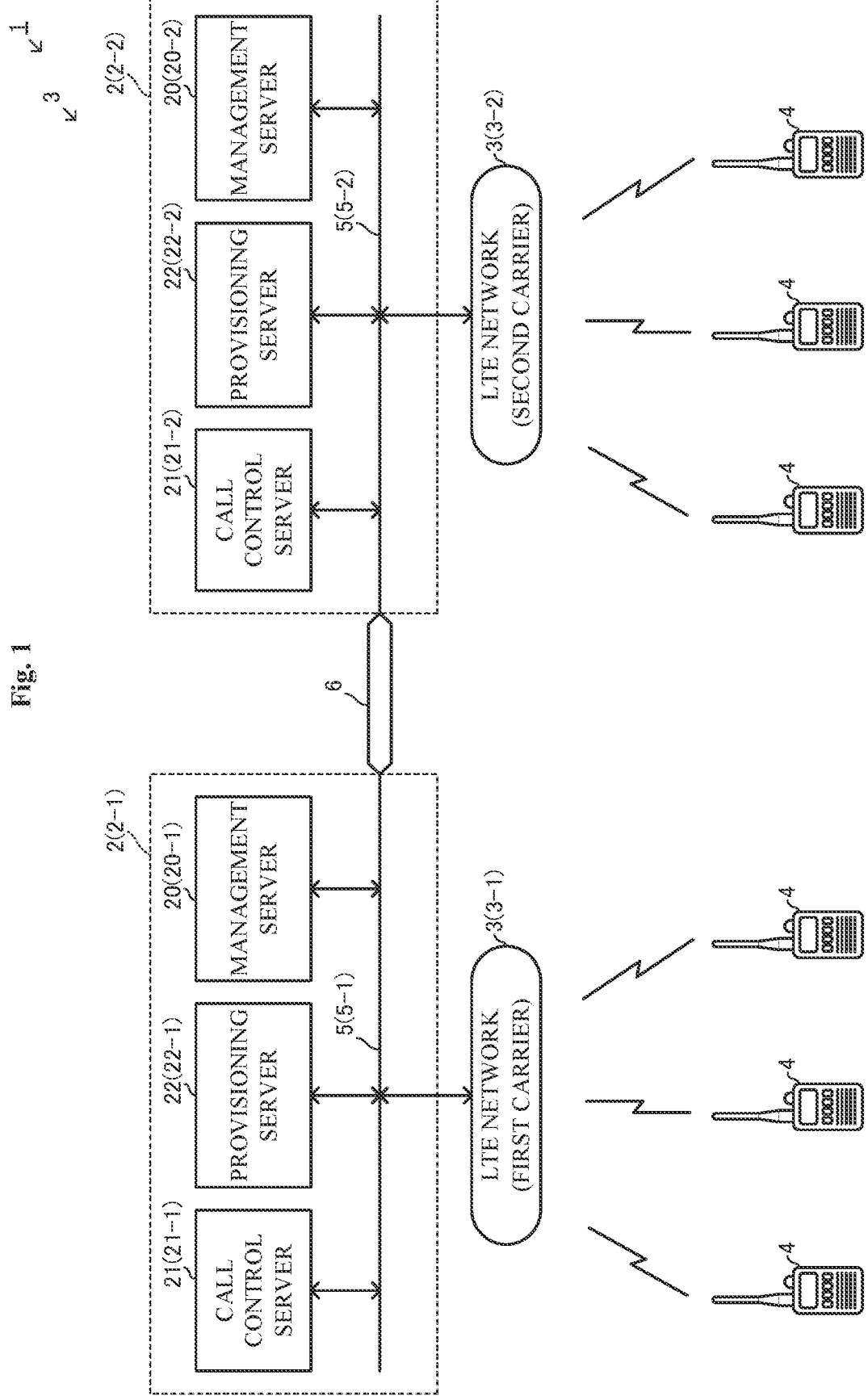
FIG. 1 is a configuration diagram of a voice communication system according to an embodiment of the present disclosure.

FIG. 1 is a diagram illustrating a configuration of a voice communication system 1 according to an embodiment of the present disclosure. The voice communication system 1 includes a plurality of (two in the present embodiment) server systems 2 (2-1 and 2-2) and a plurality of communication terminals 4. The server systems 2 and the communication terminals 4 are interconnected by a plurality of (two in the present embodiment) LTE networks 3 (3-1 and 3-2). The two LTE networks 3-1 and 3-2 are communication networks respectively provided by communication carriers (common carriers such as mobile phone operators) different from each other and are closed networks not directly connected to the Internet or the like.

The server system 2-1 is installed on the first LTE network 3-1 as a cloud server, and the server system 2-2 is installed on the second LTE network 3-2 as a cloud server. The server systems 2-1 and 2-2 are connected to each other by a VPN 6 using a dedicated line provided by the communication carriers.

A communication terminal accessing the server system 2 through the first LTE network 3-1 out of the communication terminals 4 is equipped with a SIM card for a first carrier, and a communication terminal accessing the server system 2 through the second LTE network 3-2 is equipped with a SIM card for a second carrier.

The server system 2-1 includes a call control server 21-1, a provisioning server 22-1, and a management server 20-1. Further, the server system 2-2 similarly includes a call control server 21-2, a provisioning server 22-2, and a management server 20-2. The call control server 21-1, the provisioning server 22-1, the management server 20-1, and the first LTE network 3-1 are interconnected by a local area network (LAN) 5-1. Further, the call control server 21-2, the provisioning server 22-2, the management server 20-2, and the second LTE network 3-2 are interconnected by the LAN 5-2. The LAN 5-1 and the LAN 5-2 are interconnected by the VPN 6.

The server system 2-1 and the server system 2-2 are on clouds of communication carriers different from each other, respectively, and can be installed at geographically distant locations and therefore allow construction of a fault-tolerant and robust voice communication system. The server system 2-1 and the server system 2-2 are connected by the VPN 6 being a dedicated line and therefore allow flexible process redundancy as described below, similarly to a case of being on the same network.

During normal operation, the call control server 21-1 and the provisioning server 22-1 in the server system 2-1 execute provisioning and call control on communication terminals 4 as main servers. The call control server 21-2 and the provisioning server 22-2 in the server system 2-2 are on standby as sub-servers in preparation for a case of the main servers going down.

Figure 4:
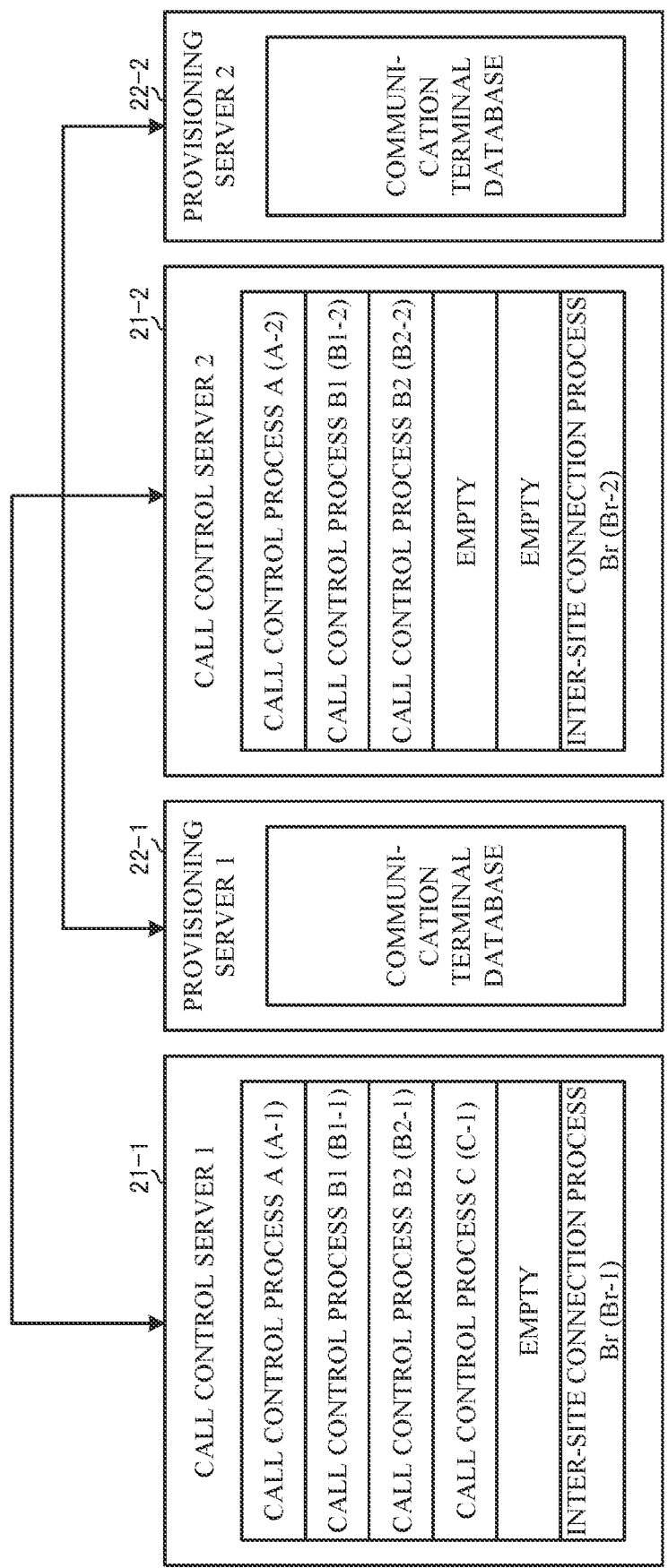
FIG. 4 is a diagram illustrating partitions in a call control server and a provisioning server, and a process (virtual server) executed in each partition.

While a case of each of the call control servers 21-1 and 21-2 executing a plurality of processes in parallel will be described in the present embodiment, each of the call control servers 21-1 and 21-2 may execute one call control process. When each of the call control servers 21-1 and 21-2 executes a plurality of processes in parallel, main/sub switching is made on a per process basis with respect to a plurality of internally started processes rather than on a hardware basis. For example, the plurality of processes is structured as illustrated in FIG. 4, and each process functions as a virtual server.

The management servers 20 (20-1 and 20-2) manage operating status of each process executed by the call control servers 21-1 and 21-2 and the provisioning servers 22-1 and 22-2 in the server systems 2-1 and 2-2 and provide information about the operating status for a server or a communication terminal 4 as requested. Each management server 20 includes a management table as illustrated in FIG. 9.

When a communication terminal 4 (calling terminal) communicates with another communication terminal 4 (called terminal), the calling terminal transmits a voice signal including identification information of the called terminal as control information to the call control server 21. The call control server 21 transfers the voice signal to the called terminal through the LTE network 3. Consequently, voice communication between the calling terminal and the called terminal through the network can be performed without an advance calling procedure such as the SIP protocol (by an operation such as that in a common wireless transceiver). The communication method is described in detail in International Publication No. WO 2015/068663.

Figure 2:
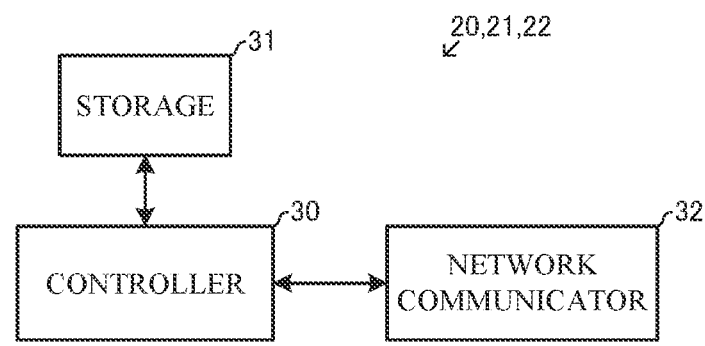
FIG. 2 is a block diagram of a server in the voice communication system.
Figure 7B:
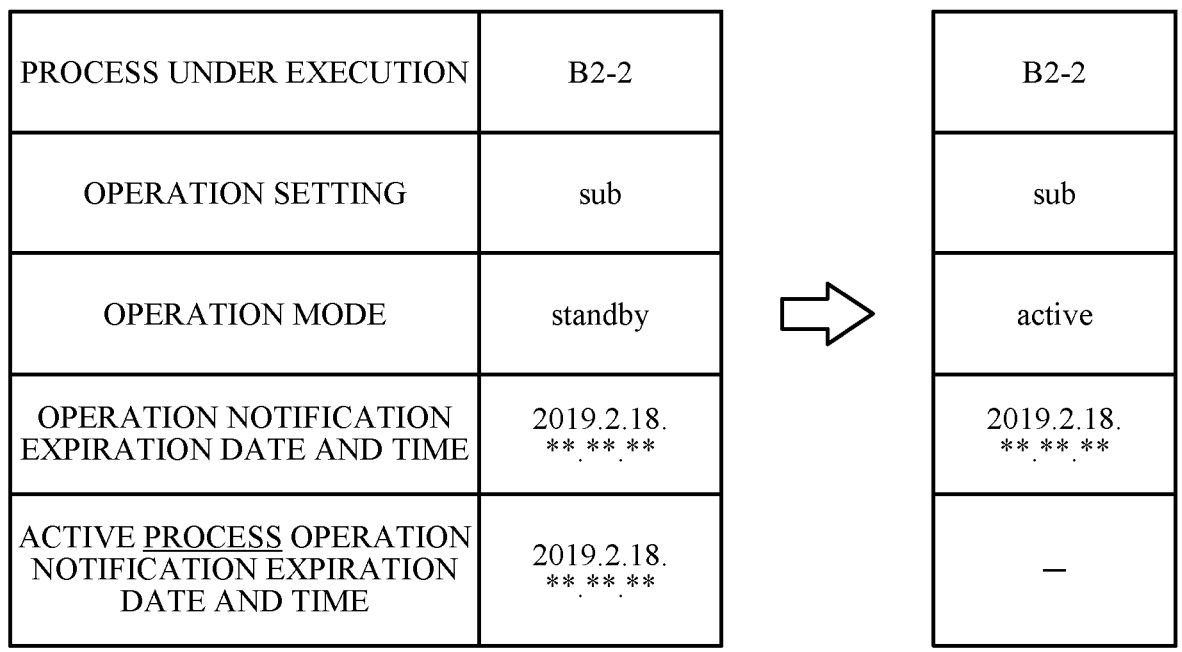
FIG. 7B is a diagram illustrating a status table provided in a sub-process.

FIG. 2 is a block diagram of each of the management servers 20 (20-1 and 20-2), the call control servers 21 (21-1 and 21-2), and the provisioning servers 22 (22-1 and 22-2). A server includes a controller 30, a storage 31, and a network communicator 32. For example, the storage 31 is configured with a hard disk and a RAM. In the case of the management server 20, the management table as illustrated in FIG. 9 is stored in the storage 31. In the case of the call control server 21, a status table as illustrated in FIGS. 7A and 7B is provided in the storage 31. The network communicator 32 communicates with a communication terminal 4 and another server through the LAN 5 and the LTE network 3. The controller 30 controls an operation of each server.

Figure 3:
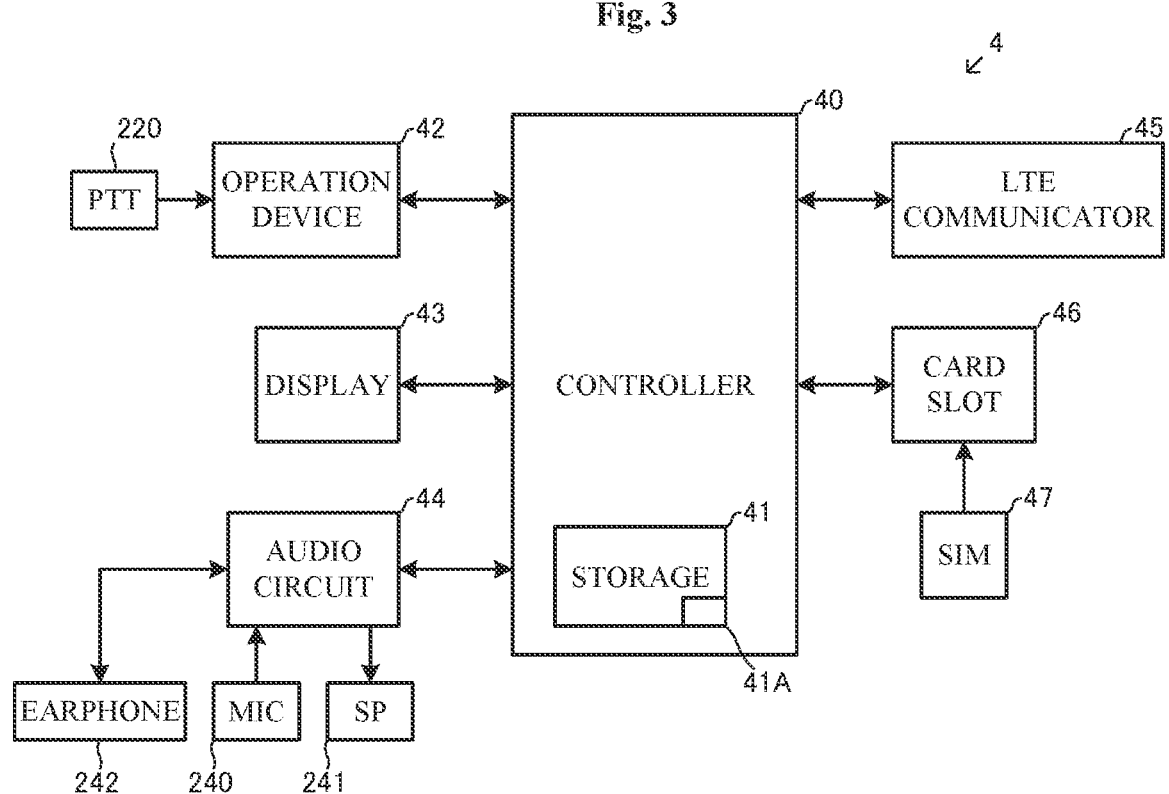
FIG. 3 is a block diagram of a communication terminal.

FIG. 3 is a block diagram of the communication terminal 4. The communication terminal 4 has an appearance of a handy transceiver as illustrated in FIG. 1 but is functionally a piece of wireless network equipment transmitting and receiving voice signals through the LTE network 3. A controller 40 controlling an operation of the device is configured with a microprocessor. The controller 40 includes a storage 41 in which various types of data are stored. The storage 41 includes a provisioning data storage area 41A. Provisioning data as illustrated in FIG. 12 are stored in the provisioning data storage area 41A. The controller 40 is connected to an operation device 42, a display 43, an audio circuit 44, an LTE communicator 45, and a card slot 46. The operation device 42 includes a key switch such as a PTT switch 220, receives a user operation, and inputs the operation signal to the controller 40. The display 43 includes a liquid crystal display. The liquid crystal display displays an identification number of a communication counterpart selected by the user operation, an identification number of a communication counterpart placing a call, and the like.

The audio circuit 44 includes a microphone 240 and a speaker 241. The controller 40 decodes a received voice signal and inputs the decoded signal to the audio circuit 44. The audio circuit 44 converts the decoded audio signal into an analog signal and outputs the analog signal from the speaker 241. The audio circuit 44 also converts a voice signal input from the microphone 240 into a digital signal and inputs the digital signal to the controller 40. The controller 40 voice-packetizes the digital audio signal and inputs the packetized signal to the LTE communicator 45. The LTE communicator 45 includes a circuit performing wireless communication by an LTE communication method. The LTE communicator 45 transmits a packet input from the controller 40 toward the LTE network 3 and inputs a packet received from the LTE network 3 to the controller 40. The audio circuit 44 is provided with an earphone connector 242. When an earphone-microphone (unillustrated) is connected to the earphone connector 242, the audio circuit 44 stops functions of the microphone 240 and the speaker 241 provided on the main body of the communication terminal 4 and enables a microphone and a speaker (earphone) in the earphone-microphone. An IC card (SIM card) 47 storing terminal identification information is set to the card slot 46. A SIM card 47 for the first carrier is set to a communication terminal 4 used in the first LTE network 3-1, and a SIM card 47 for the second carrier is set to a communication terminal 4 used in the second LTE network 3-2. The terminal identification information (ICCID) stored in the SIM card 47 is used as identification information of each communication terminal 4.

When a user inputs voice toward the microphone 240 while pressing the PTT switch 220 at a communication terminal 4 with the configuration described above, the communication terminal 4 edits the voice signal into a voice packet in which preset identification information of the called terminal is written and transmits the voice packet to the call control server 21 through the LTE network 3.

Figure 5:
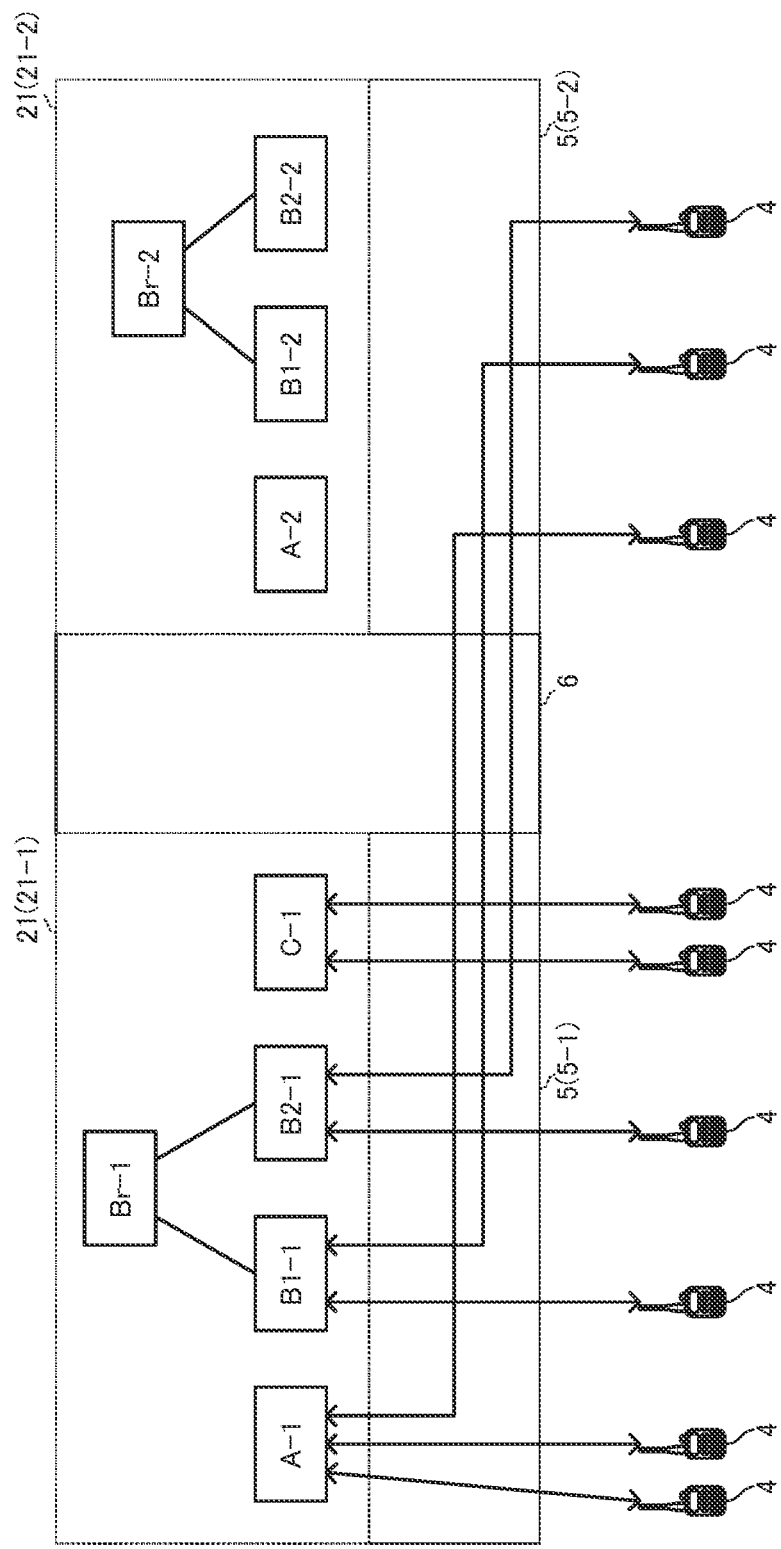
FIG. 5 is a diagram illustrating a topology between processes and communication terminals when every process is operating normally.

FIG. 4 and FIG. 5 are diagrams illustrating a redundant configuration of the call control servers 21 and the provisioning servers 22. FIG. 4 is a diagram illustrating redundancy by the call control servers 21 and the provisioning servers 22, and partition configurations of the controllers 30 in the call control servers 21; and FIG. 5 is a diagram illustrating a function of each process executed by the call control servers 21. The call control server 21 executes a plurality of mutually independent processes (virtual servers) in such a way as to be able to provide independent communication services for a plurality of clients. For example, a client is a business operator using the voice communication system 1. As illustrated in FIG. 4, the call control server 21 is divided into six partitions and executes mutually different processes in the respective partitions. While the provisioning server 22 is common to a plurality of clients, the provisioning server 22 executes mutually different types of provisioning processing, based on a unique identification number of a communication terminal 4 of each client.

Processes executed in the partitions in the call control server 21-1 are call control processes A, B, and C for controlling voice communications by clients A, B, and C, as illustrated in FIG. 5. Processes executed in the partitions in the call control server 21-2 are the call control processes A and B for controlling voice communications by the clients A and B, as illustrated in FIG. 5. In other words, the call control processes A and B for the clients A and B are provided with redundancy but the call control process C for the client C is not provided with redundancy.

The call control process A is a process for relaying voice communications between communication terminals 4 of the client A. The call control process C is a process for relaying voice communications between communication terminals 4 of the client C. One call control process can accommodate up to a predetermined number (such as 100) of communication terminals 4. "Accommodating a communication terminal 4" refers to registering the communication terminal 4 in a memory and performing relaying of voice communications and transmission of provisioning data for the communication terminal 4. When accommodating more than the predetermined number of communication terminals 4, the call control server 21 executes a plurality of call control processes and an inter-site connection process. Each call control process accommodates up to 100 communication terminals 4, and the inter-site connection process connects the call control processes; and thus voice communication between the communication terminals 4 accommodated by the call control process is enabled. The number of communication terminals 4 held (to be accommodated) by the client B is large (exceeds 100), and therefore two call control processes B1 and B2 are executed, and an inter-site connection process Br is further executed for connecting the call control processes B1 and B2. Consequently, voice communication between all communication terminals 4 belonging to the client B is achieved.

As illustrated in FIG. 4, the call control processes A and B for the clients A and B are provided with redundancy but the call control process C for the client C is not provided with redundancy. Redundancy of a call control process executed by the call control server 21 with redundant hardware can be set on a per process basis. Redundancy of each process may be determined based on a hardware resource, a degree of importance of the process, and the like.

The provisioning server 22 is a server for transmitting provisioning data as illustrated in FIG. 12 to a communication terminal 4. A communication terminal 4 accesses the provisioning server 22 when the power to the communication terminal 4 is turned on and receives provisioning data illustrated in FIG. 12. The communication terminal 4 sets up an operation of the communication terminal 4, based on the received provisioning data, and then can access a call control process for a client to which the communication terminal 4 belongs. Provisioning is described in detail in International Publication No. WO 2017/086416.

The call control server 21-1 and the provisioning server 22-1, and the call control server 21-2 and the provisioning server 22-2 do not necessarily have the same performance, and the numbers of settable partitions do not need to be the same either.

Processes executed by the call control server 21-1 out of the call control processes A and B being provided with redundancy and being executed by both the call control server 21-1 and the call control server 21-2 actually perform call control processing of relaying voice communications between communication terminals 4 as active processes. Each process executed by the call control server 21-2 stands by as a standby process for replacing a relating active process (the same process being executed by the call control server 21-1) in case of the active process going down. An operation mode (active process/standby process) of each process is stored in the management table (see FIG. 9) in the management server 20.

Both the provisioning server 22-1 and the provisioning server 22-2 are set to an active mode and respond to provisioning requests from communication terminals 4.

FIG. 5 illustrates a connection relation between each call control process and each communication terminal 4 during normal operation, in other words, when every process is executed normally. Communication terminals 4 held by each client include a communication terminal 4 being set with a SIM for the first communication carrier and accessing the server system 2 through the first LTE network 3-1 and a communication terminal 4 being set with a SIM for the second communication carrier and accessing the server system 2 through the second LTE network 3-2. The call control processes A, B1, B2, and C in the call control server 21-1 being the main server operate and actually perform the call control processing during normal operation, and therefore every communication terminal 4 is connected to a process in the call control server 21-1. The call control server 21-1 is connected to the first LTE network 3-1 side, and therefore a communication terminal 4 connected to the second LTE network 3-2 accesses the call control server 21-1 from the second LTE network 3-2 through the VPN 6. A multi-carrier communication terminal 4 being set with both a SIM for the first communication carrier and a SIM for the second communication carrier and being capable of accessing the server system 2 through either one of the first LTE network 3-1 and the second LTE network 3-2 may be provided.

Figure 6A:
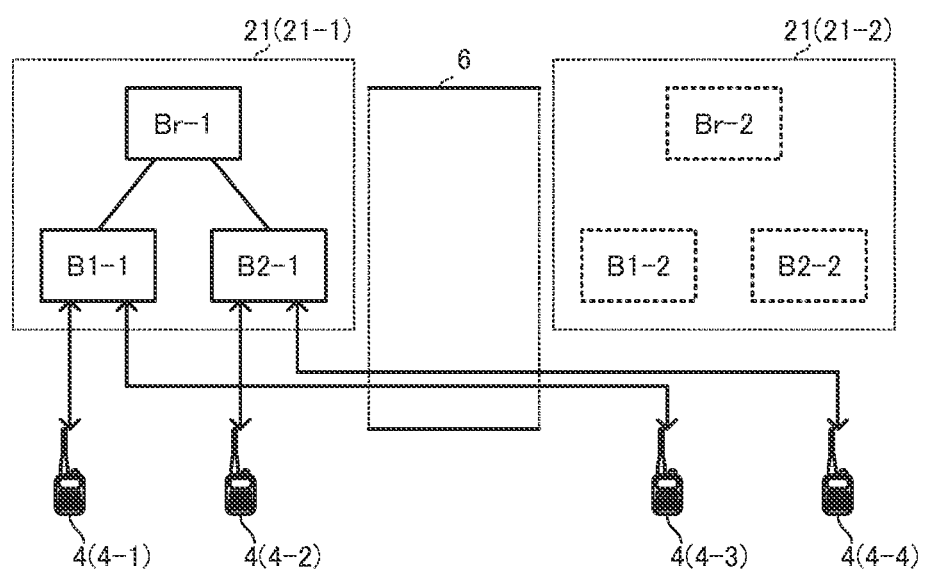
FIG. 6A is a diagram illustrating a topology between processes and communication terminals when each process is operating normally.
Figure 6B:
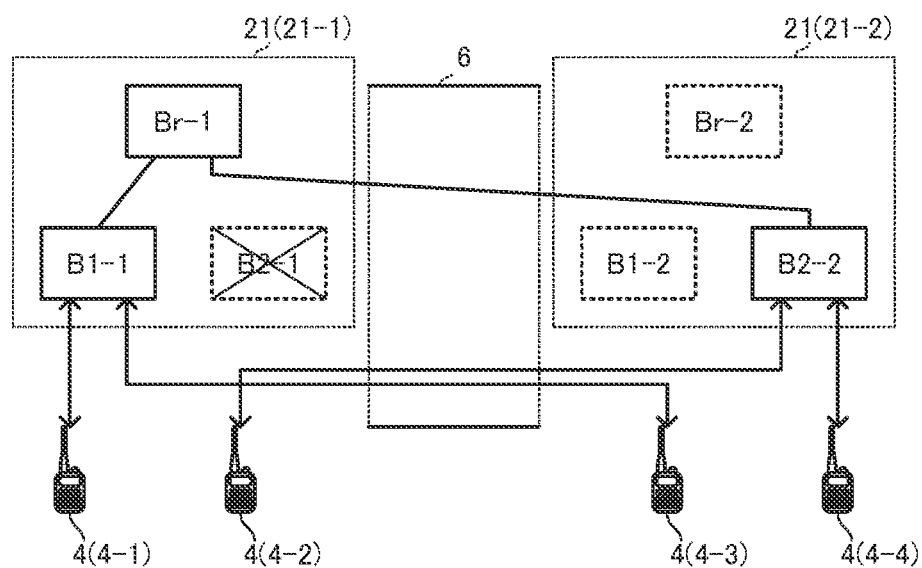
FIG. 6B is a diagram illustrating a topology between the processes and the communication terminals when part of the processes goes down.
Figure 6C:
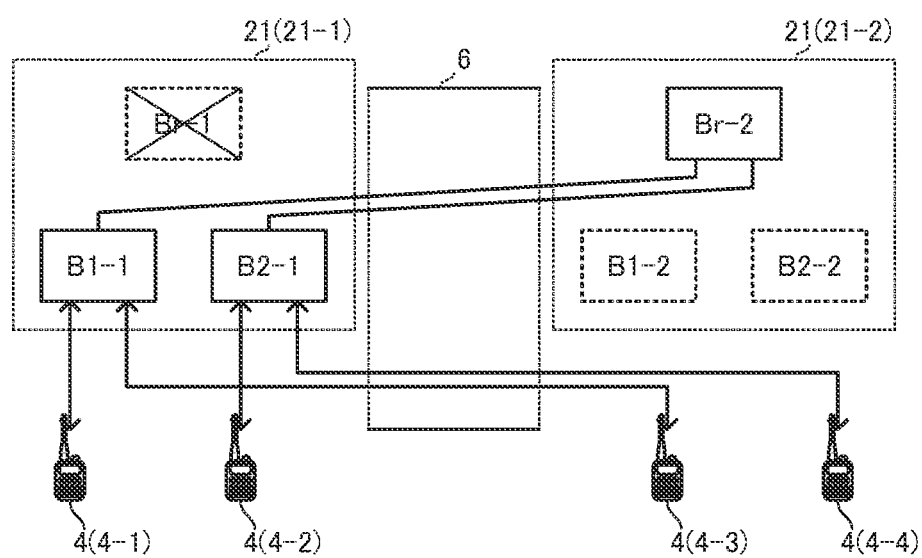
FIG. 6C is a diagram illustrating a topology between the processes and the communication terminals when part of the processes goes down.

When any process in the call control server 21-1 goes down during normal operation, the process being down is switched to a standby process in the call control server 21-2 in a topology as illustrated in FIG. 6B or FIG. 6C. In FIGS. 6A to 6C, switching from an active process to a standby process in the call control process B (the call control processes B1 and B2, and the inter-site connection process Br) for the client B will be described.

FIG. 6A illustrates a topology between processes and communication terminals 4 in a case of each process for the client B being executed normally. The topology is the same as that illustrated in FIG. 5. In this diagram, the call control processes B1-1 and B2-1, and the inter-site connection process Br-1 are in operation, and the communication terminals 4 access the call control processes B1-1 and B2-1. Specifically, a communication terminal 4-1 accesses the call control process B1-1 through the first LTE network 3-1, and a communication terminal 4-3 accesses the call control process B1-1 through the second LTE network 3-2 and the VPN 6. A communication terminal 4-2 accesses the call control process B2-1 through the first LTE network 3-1, and a communication terminal 4-4 accesses the call control process B2-1 through the second LTE network 3-2 and the VPN 6.

FIG. 6B illustrates a topology in a case of the call control process B2-1 going down. Since the call control process B2-1 being an active process is down, the call control process B2-2 being a relating standby process becomes an active process. Then, the communication terminals 4-2 and 4-4 change the access destination from the call control process B2-1 to the call control process B2-2. Specifically, the communication terminal 4-2 accesses the call control process B2-2 through the first LTE network 3-1 and the VPN 6, and the communication terminal 4-4 accesses the call control process B2-2 through the second LTE network 3-2. Further, the inter-site connection process Br-1 switches the connected sites in such a way that the main call control process B1-1 is connected to the sub-call control process B2-2.

FIG. 6C illustrates a topology in a case of the inter-site connection process Br-1 going down. Since the inter-site connection process Br-1 being an active process is down, the inter-site connection process Br-2 being a standby process becomes an active process. Since the call control processes B1-1 and B2-1 in the call control server 21-1 operate normally, the inter-site connection process Br-2 connects the call control processes B1-1 and B2-1 in the call control server 21-1 through the VPN 6. Since the call control processes B1-1 and B2-1 operate normally, similarly to during normal operation, the access destinations of the communication terminals 4-1 to 4-4 do not change.

Thus, when a plurality of processes (virtual servers) operates in the call control servers 21-1 and 21-2 as hardware, and any process goes down, the process in the call control server 21-1 is switched to a process in the call control server 21-2 on a per process basis.

Each process includes a status table as illustrated in FIGS. 7A and 7B in the storage 31 in order to store states of a process executed by the process and a relating counterpart process. The status table includes a storage area for a name, an operation setting, and an operation mode (active mode/standby mode) of a process executed by the process, an operation notification expiration date and time of the process, and an operation notification expiration date and time of an active system. Setting information being one of a main process (main), a sub-process (sub), and a stand-alone process (alone) is stored in the operation setting field. When the same processes are executed by the call control server 21-1 and the call control server 21-2, one of the processes is set to a main process, and the other is set to a sub-process. In general, a process executed by the call control server 21-1 being a main server is set to a main process, and a process executed by the call control server 21-2 being a sub-server is set to a sub-process. When both processes are operating normally, the main process enters the active mode executing actual processing, and the sub-process enters a standby mode. When the main process goes down, the sub-process enters the active mode. Whether the operation mode of the process is the active mode or the standby mode is stored in the operation mode field.

Since the call control process C is executed only by the call control server 21-1, the stand-alone process is stored in the operation setting field.

An operation notification transmitted by each process to the management server 20 and a relating standby process includes a name, an operation setting, and an operation mode of a process executed by the process, and an expiration date and time of the operation notification.

FIG. 7A is a diagram describing an example of stored contents in a status table in a main process. In this example, the process executes the call control process B2-1; and the operation setting is main, and the operation mode is the active mode. An expiration date and time of an operation notification sent by the process to the management server 20 and a counterpart sub-process is stored in an operation notification expiration date and time field. An operation notification is a message notifying that a process is operating normally to the management server 20 and a standby process, by the process. By an operation notification with a new expiration date and time being sent before the expiration date and time of the operation notification is passed, the standby process and the management server 20 confirm that the active process is operating normally. An expiration date and time of an operation notification received from a relating active process is stored in an active process operation notification expiration date and time field when the process is on stand by. Since FIG. 7A is a status table of an active process, the active process operation notification expiration date and time field received from an active process is blank.

FIG. 7B is a diagram describing an example of stored contents of a status table in a sub-process. In this example, the process executes the call control process B2-2; and the operation setting is the sub-process, and the operation mode is the standby mode. An expiration date and time of an operation notification sent by the process to the management server 20 is stored in the operation notification expiration date and time field. An expiration date and time of an operation notification sent from a relating active process (call control process B2-1) is stored in the active process operation notification expiration date and time field. When an operation notification with a new expiration date and time is sent before the expiration date and time is passed, the table is updated to the new expiration date and time, and the standby mode is continued.

When an operation notification is not sent from the active process after the expiration date and time is passed, the sub-process determines that the main process being the active process is down, switches the operation mode of the process to the active mode, and starts relaying of voice communications of communication terminals 4, as illustrated in the right-hand fields in the diagram.

Figure 8A:
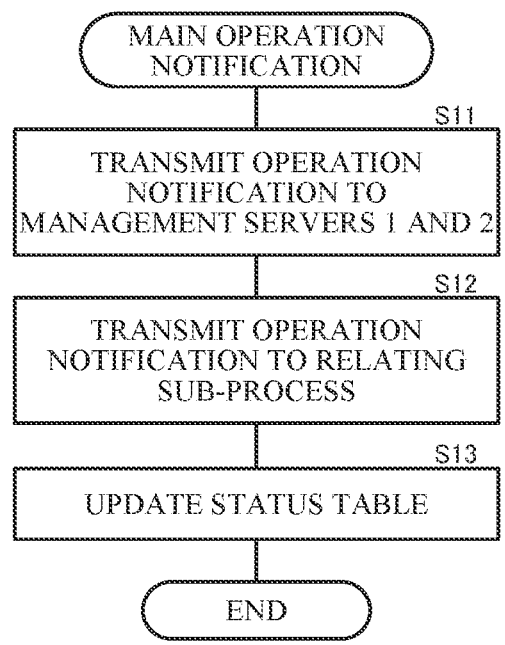
FIG. 8A is a flowchart illustrating an operation of the call control server.

FIGS. 8A to 8D are flowcharts illustrating operations of a call control process executed by the call control server 21. FIG. 8A illustrates operation notification processing of an active process. An active process periodically (for example, every minute) transmits an operation notification to the management servers 20-1 and 20-2 on both sides (S11) and also transmits an operation notification to a relating standby process (S12). The expiration date and time of the transmitted operation notification is set later than the next scheduled transmission time. The active process updates the expiration date and time of an operation notification in the status table of the active process to the expiration date and time described above (S13).

FIG. 8B illustrates operating status confirmation processing executed by an active process and a standby process. The processing is also executed periodically. Active processes include an active process connected to another process. For example, being connected to another process refers to a state in which the call control process B1 and the inter-site connection process Br, and the call control process B2 and the inter-site connection process Br illustrated in FIG. 5 and FIGS. 6A to 6C are respectively connected. When a process is connected to another process in such a topology, the process performs processing such as switching a connection destination of the process according to operating status of the other process. The process inquires of the management server 20 about operating status of each process at every predetermined time (S16). When operating status of each process is returned from the management server 20 in response to the inquiry (S17), the process determines whether there is a change in operating status of a connection destination, such as a process in the connection destination being down and a standby process being switched to an active process (S18). When there is a change in the operating status of the connection destination (YES in S18), the process switches the connection destination according to the current operating status (S19) and ends the processing. When the process is not connected to another process or there is no change in the connection destination (NO in S18), the process ends the operating status confirmation processing.

For example, in a case that the call control process B2-1 goes down as illustrated in FIG. 6B, the inter-site connection process Br-1 recognizes that the call control process B2-1 is down, and the call control process B2-2 being a standby process thereof has started operation when inquiring of the management server 20-1 about operating status. Then, by starting interprocess communication with the call control process B2-2, the inter-site connection process Br-1 maintains the operation of the call control process B2.

The inquiry to the management server 20 in FIG. 8B is made to a management server 20 on the same side, that is, a management server 20 installed in the server system 2-1 or 2-2 being the same as the server system in which the call control server 21 by which the process is executed is installed. When the management server 20 does not respond to the inquiry, the process makes an inquiry again to a management server 20 on the opposite side. The management server 20 on the opposite side refers to a management server 20 installed in the server system 2-1 or 2-2 being different from the server system in which the call control server 21 by which the process is executed is installed.

While an inquiry to the management server 20 may be made at fixed time intervals, operating status (communication counterpart) of each process may be inquired of the management server 20 every time a change in interprocess communication or switching of the operation mode in the standby process (see FIG. 8D) occurs.

Figure 8C:
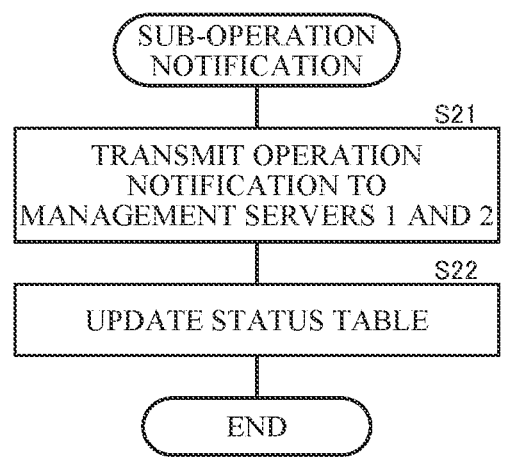
FIG. 8C is a flowchart illustrating an operation of the call control server.

FIG. 8C illustrates operation notification processing of a standby process. A standby process periodically (for example, every minute) transmits an operation notification to the management servers 20-1 and 20-2 on both sides (S21). The expiration date and time of the transmitted operation notification is set later than the next scheduled transmission time. The standby process updates the expiration date and time of an operation notification in the status table of the standby process to the expiration date and time described above (S22).

FIG. 8D illustrates operating status confirmation processing of a standby process. The processing is also executed periodically. A standby process determines whether an operation notification from an active process is valid with reference to the status table (S24). When the expiration date and time of the operation notification from the active process is passed (NO in S24), the standby process determines that the active process is down. The standby process sets connection destinations and the like according to the operating status of each process acquired in the processing in FIG. 8B and starts operation as an active process in place of the active process (main process) being down (S25). The new active process rewrites the operation mode in the status table to the active mode (S26). For example, when the inter-site connection process Br-1 goes down as illustrated in FIG. 6C, the inter-site connection process Br-2 starts an operation of performing interprocess communication with the call control processes B1-1 and B2-1 in operation.

After starting to operate as an active process, the new active process notifies the management server 20 that the operation mode is changed (S27). The operation mode change notification also serves as an operation notification. On the other hand, when the active process is normally operating in S24, in other words, when the expiration date and time of the operation notification is not passed (YES in S24), the standby process ends the operating status confirmation processing.

FIG. 9 is a diagram illustrating an example of the management table set in the management server 20. FIG. 9 only describes parts related to processes in the call control servers 21-1 and 21-2 in the management table. A similar table is provided for each process in the provisioning servers 22-1 and 22-2.

The management table 310 stores information about every process executed by the (first) call control server 21-1 being a main server and the (second) call control server 21-2 being a sub-server. The management table 310 stores an operation notification expiration date and time, an operation setting, and an operation mode for each process. An expiration date and time described in an operation notification sent from a process is stored in the operation notification expiration date and time field. When the management server 20 receives a new operation notification from the process at or before the expiration date and time, the expiration date and time is updated to an expiration date and time described in the new operation notification. Setting information being either one of a main process and a sub-process is stored in the operation setting field. Either one of the active mode and the standby mode is stored in the operation mode field.

When a new operation notification is not sent from each process at or before the operation notification expiration date and time, the management server 20 determines that the process is down (a function to transmit an operation notification is lost) and rewrites the operation mode to down. Since an inquiry about operating status of every process is periodically made by a normally operating process, the management server 20 returns information such as a normally operating process, a process on normal stand by, and a process being down, in response to the inquiry. Each process makes switching of a connection destination and the like, based on the operating status. Further, when receiving a notification of a start of operation from a process starting operation in response to an active process going down, the management server 20 rewrites the operation mode of the process in the management table to the active mode.

An area for storing connection destination processes being communication counterparts with respect to processes performing interprocess communication (such as the call control processes B1-1, B1-2, and the inter-site connection process Br-1) may be provided in the management table.

Figure 10A:
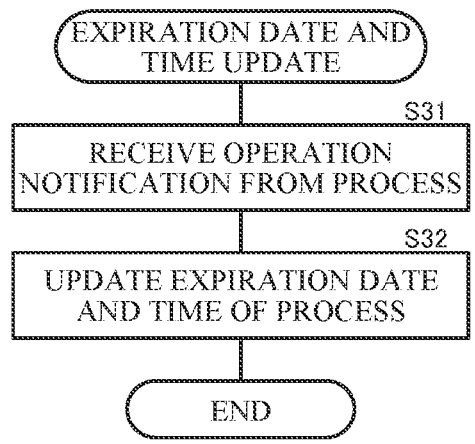
FIG. 10A is a flowchart illustrating an operation of the management server.

FIGS. 10A to 10E are flowcharts illustrating operations of the management server 20. FIG. 10A is a flowchart illustrating an expiration date and time update operation. When receiving an operation notification from any process (S31), the management server 20 updates the operation notification expiration date and time of the process in the management table (S32). When a process is started and transmits an operation notification for the first time, the management server 20 registers the process in the management table and writes an operation notification expiration date and time.

Figure 10B:
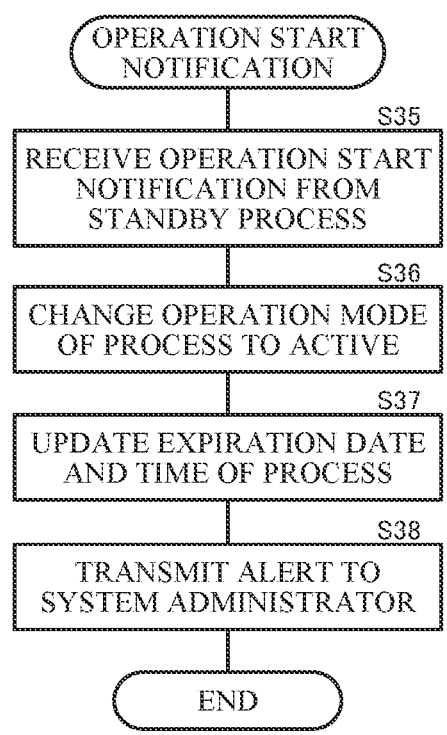
FIG. 10B is a flowchart illustrating an operation of the management server.

FIG. 10B is a flowchart illustrating an operation when an operation start notification is received from a process. When receiving a notification of a start of operation from a standby process (in place of an active process going down) (S35: see S27 in FIG. 8D), the management server 20 changes the operation mode of the process in the management table 310 to the active mode (S36). Since the operation start notification also serves as an operation notification, the management server 20 updates the operation notification expiration date and time of the process (S37). The management server 20 transmits an alert that the active process is changed, to a terminal (personal computer) of a system administrator by mail or the like (S38).

Figure 10C:
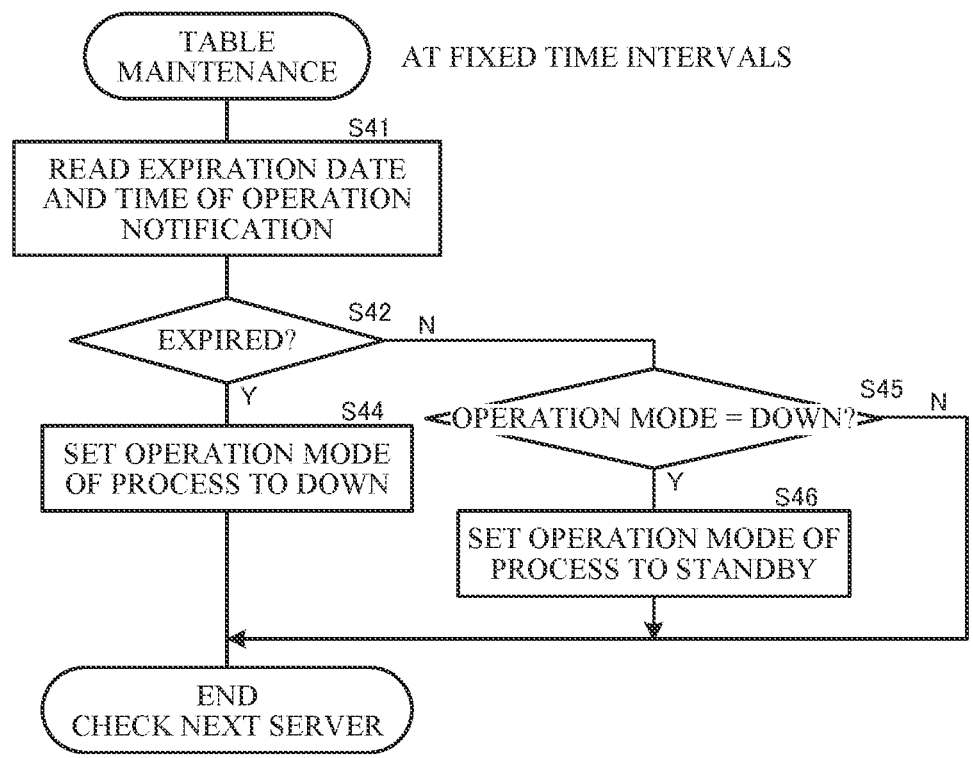
FIG. 10C is a flowchart illustrating an operation of the management server.

FIG. 10C is a flowchart illustrating a table maintenance operation. The following processing is executed on every process periodically stored in the management table 310. The management server 20 reads an expiration date and time of an operation notification of a process (S41). The management server 20 compares the expiration date and time with the current time and when the expiration date and time is passed (YES in S42), rewrites the operation mode to down (S44). The management server 20 executes the operation on every process stored in the management table 310. While rewriting of the operation mode to down is performed even when a down state is continuing and the operation mode is already rewritten to down in S44, rewriting may not be performed when the operation mode is already the down mode.

When the expiration date and time of the operation notification is not passed (NO in S42), the management server 20 determines whether the current operation mode is down (S45). When the operation mode is down (YES in S45), the management server 20 rewrites the operation mode to the standby mode (S46). When the expiration date and time of the operation notification is not passed (NO in S42) and the operation mode is not down (NO in S45), the management server 20 ends the maintenance processing on the process. The management server 20 successively executes the maintenance processing from S41 to S46 on every process stored in the management table 310.

As described in S46, when a process once going down recovers, the process operates as a standby process in preparation for the currently active process going down. When a process the operation setting of which is set to a main process recovers, the main process may return to the active process, and a sub-process operating as an active process until then may switch to the standby mode.

FIG. 11A is a diagram describing stored contents of the management table 310 when the call control processes of the client B enter the state in FIG. 6B. FIG. 11B is a diagram describing stored contents of the management table 310 when the call control processes of the client B enter the state in FIG. 6C. In the diagrams, only the operation mode field of each process is indicated. In the state in FIG. 6B, the call control process B2-1 is down, and the call control process B2-2 is operating instead. In this case, the operation mode of the call control process B2-1 is rewritten to down also in the management table illustrated in FIG. 11A, and the operation mode of the call control process B2-2 is the active mode instead.

In the state in FIG. 6C, the inter-site connection process Br-1 in the call control server 21-1 is down, and the inter-site connection process Br-2 in the call control server 21-2 is operating instead. In this case, the operation mode of the inter-site connection process Br-1 is rewritten to down also in the management table 310 illustrated in FIG. 11B, and the operation mode of the inter-site connection process Br-2 is the active mode instead.

Thus, the management server 20 updates the management table according to a change in the operation mode of each process and transmits the contents of the table in response to an inquiry from another process or a communication terminal 4. The above allows a process to recognize a state of another process and facilitates a change of a connection destination of interprocess communication and a change of a call control process to be accessed by a communication terminal 4.

The management server 20 also functions as a web server. The contents of the management table, an update history thereof, and the like can be displayed on a personal computer of a manager through the LAN 5 or the LTE network 3.

FIG. 10D is a flowchart illustrating processing of the management server 20 responding to an inquiry from a process. When an inquiry about operating status is made by a process (S50: see S16 in FIG. 8B and S25 in FIG. 8D), the management server 20 transmits operating status of each process (contents of the management table) to the process making the inquiry (S51). Consequently, the process can recognize operating status of other processes.

Figure 10E:
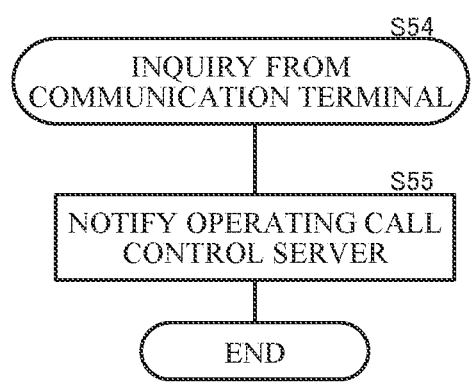
FIG. 10E is a flowchart illustrating an operation of the management server.

FIG. 10E is a flowchart illustrating processing of the management server 20 responding to an inquiry from a communication terminal 4. When an inquiry about an active call control process is made by a communication terminal 4 (S54), the management server 20 notifies a call control process on the operating side out of call control processes of a client to which the communication terminal 4 belongs (S55). Consequently, when the operating call control process goes down and the active call control process is switched, the communication terminal 4 can access the switched call control process.

FIG. 12 is a diagram illustrating an example of provisioning data 41 stored in a memory in a communication terminal 4. The provisioning data 41 include a main provisioning server address, a sub-provisioning server address, a main call control server address, a sub-call control server address, and various types of setting information.

The main provisioning server address includes an IP address and a port number of the provisioning server 22-1. The sub-provisioning server address includes an IP address and a port number of the provisioning server 22-2. The addresses may be given by the provisioning server 22 or may be stored in the communication terminal 4 in advance.

The main call control server address includes an IP address of the call control server 21-1 and a port number of a process of a client to which the communication terminal 4 belongs. The sub-call control server address includes an IP address of the provisioning server 22-2 and a port number of a process of a client to which the communication terminal 4 belongs. An active flag indicating an address of an active process is provided for each of the main provisioning server address, the sub-provisioning server address, the main call control server address, and the sub-call control server address. An active flag is set to each of the main provisioning server address and the main call control server address by default.

For example, various types of setting information include a calling ID of a communication terminal 4, a notification sound setting (selection information about a notification sound at arrival of an incoming call), an earphone setting (setting information about whether full-duplex communication is performed when an earphone-microphone is connected), an address book (a calling ID list of callable communication terminals 4), and a sound volume setting (sound volume setting information about a telephone conversation sound).

Figure 13A:
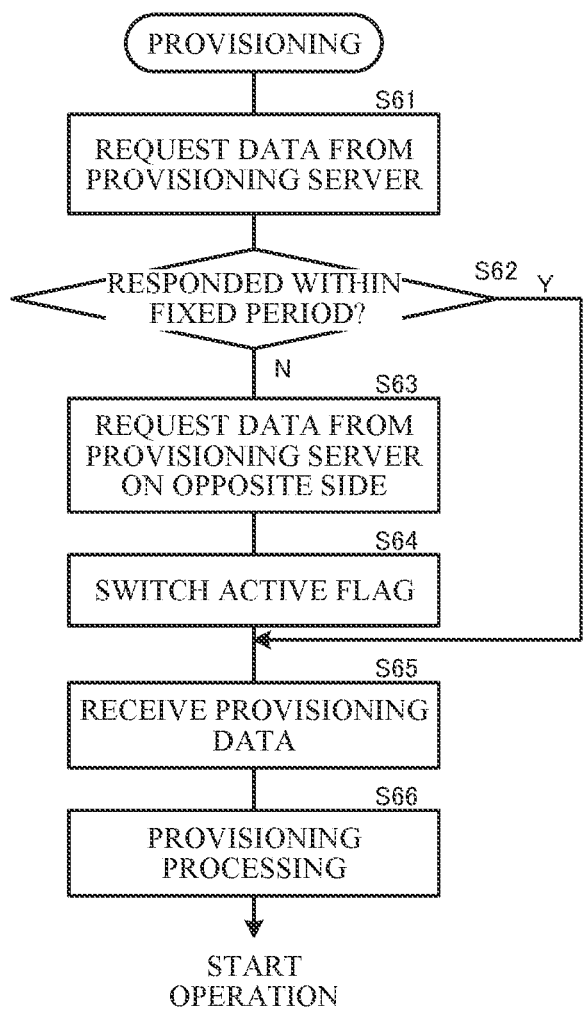
FIG. 13A is a flowchart illustrating an operation of the communication terminal.
Figure 13B:
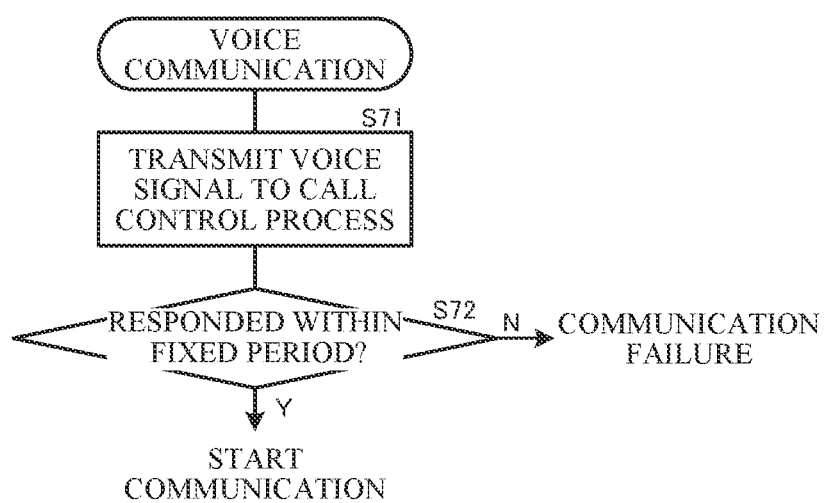
FIG. 13B is a flowchart illustrating an operation of the communication terminal.

FIGS. 13A to 13C are flowcharts illustrating operations of a communication terminal 4. FIG. 13A is a flowchart illustrating a provisioning operation. The operation is executed when, for example, the power to a communication terminal 4 is turned on. The controller 40 in the communication terminal 4 accesses the provisioning server 22-1 being a main server and requests transmission of provisioning data (S61). When the provisioning server 22-1 responds within a fixed period (YES in S62), the communication terminal 4 receives provisioning data from the server (S65) and executes provisioning (S66). When the provisioning server 22-1 does not respond within the fixed period (NO in S62), the communication terminal 4 accesses the provisioning server 22-2 being a sub-server, requests transmission of provisioning data (S63), and switches the active flag to the sub-provisioning server 22-2 side (S64). Then, the communication terminal 4 receives provisioning data from the sub-provisioning server 22-2 (S65). When the two provisioning servers 22-1 and 22-2 go down simultaneously, the communication terminal 4 may attempt connection by use of previously acquired provisioning data.

FIG. 13B is a flowchart illustrating an operation when a communication terminal 4 performs voice communication. The operation starts when the PTT switch 220 is pressed. The controller 40 in the communication terminal 4 transmits a voice signal to a call control process (virtual server) allocated to the communication terminal 4 in the main call control server 21-1 (S71). When the process in the call control server 21-1 responds within a fixed period (YES in S72), the communication terminal 4 starts voice communication. When the process in the call control server 21-1 does not respond within the fixed period (NO in S72), the communication terminal 4 performs display indicating a failed communication, or the like and stops the operation. The communication down state is a state that may occur when a call control process operating until then goes down and then communication is started before active process confirmation in FIG. 13C.

FIG. 13C is a flowchart illustrating an operation of a communication terminal 4 inquiring about an operating call control process. While the processing is periodically performed, the processing may be temporarily executed when a call control process determined to be active in S72 in FIG. 13B does not respond. The controller 40 in the communication terminal 4 inquires of the management server 20 about an active call control process accommodating the communication terminal 4 (S73). In response to the inquiry, information about the active process is sent from the management server 20. The communication terminal 4 receives the information (S74: see S55 in FIG. 10E) and determines whether the active process is switched (S75). When the active process is switched (YES in S75), the communication terminal 4 switches the active flag of the call control server to the active process side (sub-call control serverside) (S76). From here onward, when a voice communication occurs, the communication terminal 4 accesses a call control process switched to the active process.

A communication terminal 4 transmits a message requesting registration (registration message) to a call control server 21 in the active mode at the start of operation, periodically, and at every opportunity such as movement between areas. By receiving the message, the call control server 21 in the active mode can recognize a communication terminal in operation and register the communication terminal 4 in a terminal table. When no response is returned after transmitting the registration message to the call control server 21-1 or 2 assumed to be in the active mode, the communication terminal 4 determines that the call control server 21-1 or 2 is down and transmits a registration message again to the call control server 21-2 or 1 on the opposite side.

While a communication terminal 4 periodically inquires of the management server 20 about a call control process in the active mode in the flowcharts illustrated in FIGS. 10A to 10E and FIGS. 13A to 13C, the communication terminal 4 may resolve which call control process is in the active mode, based on whether the aforementioned registration message is responded to.

When a call control process operating in the standby mode receives a registration message from a communication terminal, the call control process may return, to the communication terminal, a response urging switching of the destination of the registration message to a call control process on the opposite side (in the active mode) and retransmission of the registration message.

Determining a call control server 21 in the active mode, based on whether a registration message is responded to, can eliminate frequent inquiry to the management server 20 even when the number of communication terminals 4 is large and can lighten the load on the management server 20. However, since an interval between registrations is generally longer than an interval between inquiries described in FIG. 13C and the like, the time until a communication terminal 4 recognizes a change of a call control process in the active mode becomes longer.

Switching of call control operations when a process in the call control server 21-1 or 21-2 goes down has been described above. Even when a process is not down, the VPN 6 connecting the server system 2-1 to the server system 2-2 may go down. A degeneracy operation when the VPN 6 goes down will be described with reference to FIG. 14 and FIGS. 15A and 15B.

Figure 14:
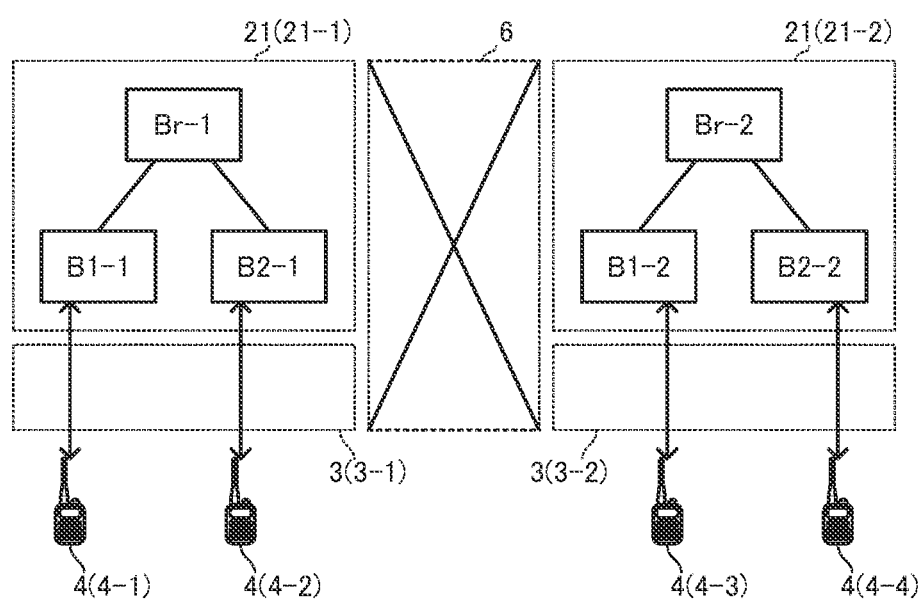
FIG. 14 is a diagram illustrating a topology between the call control processes and the terminal devices when a VPN connecting server systems goes down.

FIG. 14 illustrates a topology between processes when the VPN 6 goes down in the call control process of the client B. The management servers 20-1 and 20-2, the call control servers 21-1 and 21-2, and the provisioning servers 22-1 and 22-2 are operating normally, and the call control processes B1-1, B2-1, B1-2, and B2-2, and the inter-site connection processes Br-1 and Br-2 are also operating normally.

When the VPN 6 goes down, communication between the server systems 2-1 and 2-2 is interrupted. Even in this case, the management server 20-1, the call control server 21-1, and the provisioning server 22-1 in the server system 2-1 are operating normally, and therefore services such as the call control process B to communication terminals 4 (4-1 and 4-2) accessing the server system 2-1 through the first LTE network 3-1 can be continued.

On the other hand, in the server system 2-2, the management server 20-2, the call control server 21-2, and the provisioning server 22-2 are also operating normally, and an operation notification from each process in the server system 2-1 does not arrive; and therefore each process in the management server 20-2, the call control server 21-2, and the provisioning server 22-2 determines that every process on the server system 2-1 side is down, and each process in the call control server 21-2 and the provisioning server 22-2 switches from the standby mode to the active mode and operates call control processes for the client B. Then, a call control process launched in the call control server 21-2 provides service for communication terminals 4(4-3 and 4-4) accessing the server system 2 through the second LTE network 3-2.

Thus, when the VPN 6 goes down, communication connecting the first and second LTE networks 3-1 and 3-2 is interrupted but the call control process B in each of the first and second LTE networks 3-1 and 3-2 enters the active mode, and service can be provided in each range.

At this time, every process in the call control server 21-1 is set to the active mode and the operation mode of every process in the call control server 21-2 is set to down in the management table 310 in the management server 20-1 in the server system 2-1, as illustrated in FIG. 15A. On the other hand, the operation mode of every process in the call control server 21-1 is set to down and every process in the call control server 21-2 is set to the active mode in the management table in the management server 20-2 in the server system 2-2, as illustrated in FIG. 15B. The call control process C is not provided with redundancy and is executed only by the call control server 21-1. Accordingly, when a communication terminal 4 of the client C is in the second LTE network 3-2 area in a case of the VPN 6 going down, the communication terminal 4 cannot communicate.

The degeneracy operation is achievable by the operations of each process in the call control servers 21-1 and 21-2 illustrated in FIGS. 8A to 8D and the operations of the management servers 20-1 and 20-2 illustrated in FIGS. 10A to 10E, as an operation in response to interruption of an operation notification from a process on the other side due to the VPN 6 going down.

Figure 16A:
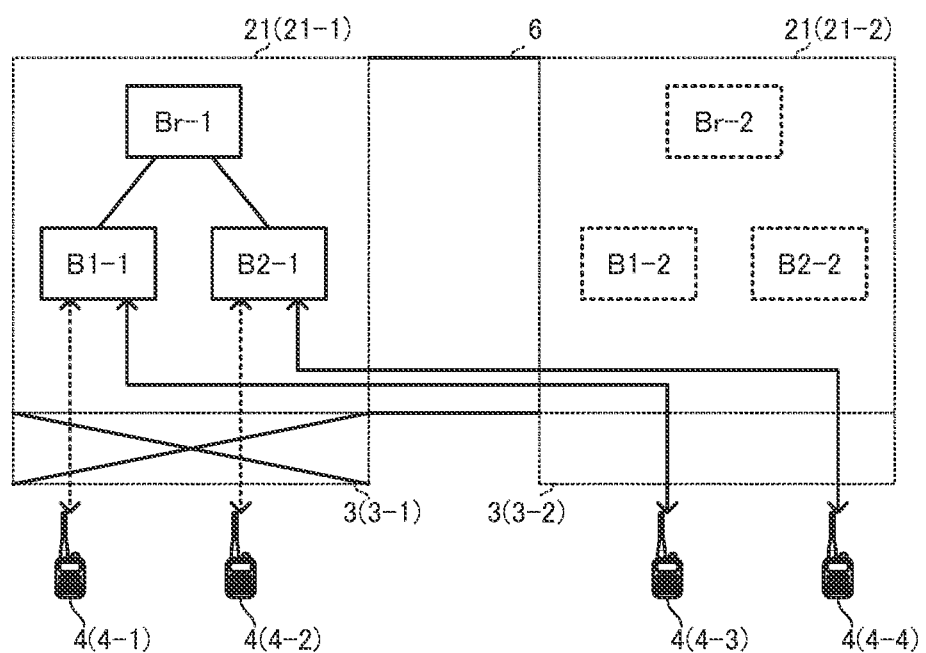
FIG. 16A is a diagram illustrating an operational configuration when a first LTE network out of two LTE networks goes down.
Figure 16B:
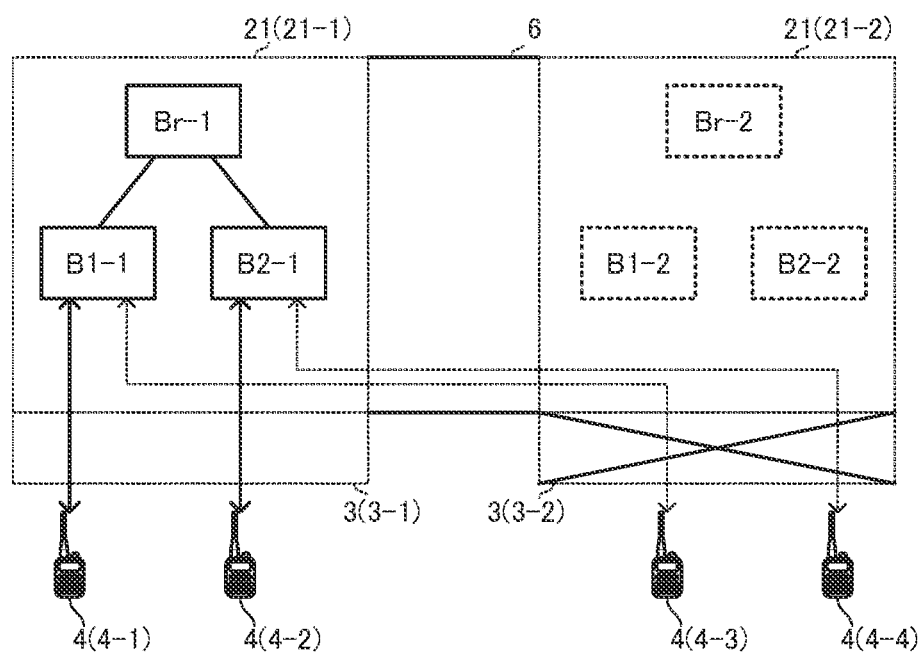
FIG. 16B is a diagram illustrating an operational configuration when a second LTE network out of the two LTE networks goes down.

FIGS. 16A and 16B are diagrams illustrating operational configurations when service by one of the LTE networks 3 (3-1 and 3-2) goes down. FIG. 16A illustrates an operational configuration when the first LTE network 3-1 goes down. Since the first LTE network 3-1 is down, the communication terminals 4-1 and 4-2 connected to the first LTE network 3-1 cannot communicate. However, the call control processes B1-1 and B1-2 being active processes in the call control server 21-1 operating in the server system 2-1 are connected to the second LTE network 3-2 through the VPN 6, and therefore the communication terminals 4-3 and 4-4 connected to the second LTE network 3-2 can access and communicate with the call control processes B1-1 and B2-1, and communication using only one network 3-2 is maintained.

Further, FIG. 16B illustrates an operational configuration when the second LTE network 3-2 goes down. Since the second LTE network 3-2 is down, the communication terminals 4-3 and 4-4 connected to the second LTE network 3-2 cannot communicate. However, the call control processes B1-1 and B1-2 being active processes are installed on the first LTE network 3-1, and therefore the communication terminals 4-1 and 4-2 connected to the first LTE network 3-1 can access and communicate with the call control processes B1-1 and B2-1, and communication using only one network 3-1 is maintained.

A multi-carrier communication terminal equipped with SIMs for both the first LTE network 3-1 and the second LTE network 3-2 can perform communication by connecting to an LTE network in which no failure is occurring.

While operation settings are made in such a way that each process executed by the call control server 21-1 is set as a main process with the call control server 21-1 as a main server and the call control server 21-2 as a sub-server in the present embodiment, processes operations of which are set as main processes may be distributed between the call control servers 21-1 and 21-2.

While a configuration in which two each of the server systems 2 and the networks 3 are provided has been described in the aforementioned embodiment, the configuration may include third and fourth server systems and networks, and so forth. Thus, further redundancy can be provided.

REFERENCE SIGNS LIST

1 Voice communication system
2 (2-1, 2-2) Server system
20 (20-1, 20-2) Management server
21 (21-1, 21-2) Call control server
22 (22-1, 22-2) Provisioning server
3 (3-1, 3-2) LTE network
4 (4-1 to 4-4) Communication terminal

The invention claimed is:

1. A voice communication system comprising:
a first server system being installed on a first network and including a first call control server;
a second server system being installed on a second network separated from the first network and including a second call control server; and
a communication line connecting the first server system to the second server system and being different from the first and second networks, wherein
the first call control server and the second call control server execute, in parallel, a call control process controlling voice communication between a plurality of communication terminals connected to the first and second networks, and
a voice signal of the communication terminal in voice communication is transferred through the first and second networks and the communication line.

2. The voice communication system according to claim 1, wherein the first network and the second network are closed networks provided by common carriers different from each other, respectively.

3. The voice communication system according to claim 2, wherein
the first server system further includes a first management server including a management table storing operating status of the first and second call control servers, and
the second server system further includes a second management server including a management table storing operating status of the first and second call control servers,
each of the first call control server and the second call control server periodically transmits the operation notification being a message notifying that the call control server is operating normally, to the first management server and the second management server, the first or second call control server transmits, when switching an operation mode of the call control server from the standby mode to the active mode, a mode switch notification being a message notifying the switching, to the first management server and the second management server, each of the first management server and the second management server stores operating status of each call control server acquired by the operation notification and the mode switch notification into the management table, and the communication terminal inquires of a management server on a network to which the communication terminal is connected about which of the first call control server and the second call control server is an active server and accesses a returned call control server.

4. The voice communication system according to claim 2, wherein a first communication terminal connectable to the first network and a second communication terminal connectable to the second network are provided as the communication terminals, the first communication terminal can access the first call control server through the first network and can access the second call control server through the first network and the communication line, the second communication terminal can access the second call control server through the second network and can access the first call control server through the second network and the communication line, out of the first call control server and the second call control server executing the call control process in parallel, one call control server operates in an active mode actually controlling voice communication, and another call control server operates in a standby mode that, when the call control server in the active mode does not operate normally, becomes the active mode in place of the call control server not operating normally, an active server being a call control server in the active mode periodically transmits an operation notification being a message notifying that the active server is operating normally, to a standby server being a call control server in the standby mode through the communication line, and the standby server maintains the standby mode while periodically receiving the operation notification, and the communication terminal accesses the call control server in the active mode and performs voice communication with another communication terminal.

5. The voice communication system according to claim 4, wherein the first server system further includes a first management server including a management table storing operating status of the first and second call control servers, and the second server system further includes a second management server including a management table storing operating status of the first and second call control servers, each of the first call control server and the second call control server periodically transmits the operation notification being a message notifying that the call control server is operating normally, to the first management server and the second management server, the first or second call control server transmits, when switching an operation mode of the call control server from the standby mode to the active mode, a mode switch notification being a message notifying the switching, to the first management server and the second management server, each of the first management server and the second management server stores operating status of each call control server acquired by the operation notification and the mode switch notification into the management table, and the communication terminal inquires of a management server on a network to which the communication terminal is connected about which of the first call control server and the second call control server is an active server and accesses a returned call control server.

6. The voice communication system according to claim 4, wherein, when communication between the first and second server systems is interrupted due to a failure in the communication line, the active server maintains the active mode, the standby server switches an operation mode of the standby server to the active mode and starts controlling voice communication, a communication terminal connected to a network on the active server side accesses the active server and performs voice communication with another communication terminal accessing the active server, and a communication terminal connected to a network on the standby server side accesses the standby server entering the active mode and performs voice communication with another communication terminal accessing the standby server entering the active mode.

7. The voice communication system according to claim 6, wherein the first server system further includes a first management server including a management table storing operating status of the first and second call control servers, and the second server system further includes a second management server including a management table storing operating status of the first and second call control servers, each of the first call control server and the second call control server periodically transmits the operation notification being a message notifying that the call control server is operating normally, to the first management server and the second management server, the first or second call control server transmits, when switching an operation mode of the call control server from the standby mode to the active mode, a mode switch notification being a message notifying the switching, to the first management server and the second management server, each of the first management server and the second management server stores operating status of each call control server acquired by the operation notification and the mode switch notification into the management table, and the communication terminal inquires of a management server on a network to which the communication terminal is connected about which of the first call control server and the second call control server is an active server and accesses a returned call control server.

8. The voice communication system according to claim 1, wherein a first communication terminal connectable to the first network and a second communication terminal connectable to the second network are provided as the communication terminals, the first communication terminal can access the first call control server through the first network and can access the second call control server through the first network and the communication line, the second communication terminal can access the second call control server through the second network and can access the first call control server through the second network and the communication line, out of the first call control server and the second call control server executing the call control process in parallel, one call control server operates in an active mode actually controlling voice communication, and another call control server operates in a standby mode that, when the call control server in the active mode does not operate normally, becomes the active mode in place of the call control server not operating normally, an active server being a call control server in the active mode periodically transmits an operation notification being a message notifying that the active server is operating normally, to a standby server being a call control server in the standby mode through the communication line, and the standby server maintains the standby mode while periodically receiving the operation notification, and the communication terminal accesses the call control server in the active mode and performs voice communication with another communication terminal.

9. The voice communication system according to claim 8, wherein the first server system further includes a first management server including a management table storing operating status of the first and second call control servers, and the second server system further includes a second management server including a management table storing operating status of the first and second call control servers, each of the first call control server and the second call control server periodically transmits the operation notification being a message notifying that the call control server is operating normally, to the first management server and the second management server, the first or second call control server transmits, when switching an operation mode of the call control server from the standby mode to the active mode, a mode switch notification being a message notifying the switching, to the first management server and the second management server, each of the first management server and the second management server stores operating status of each call control server acquired by the operation notification and the mode switch notification into the management table, and the communication terminal inquires of a management server on a network to which the communication terminal is connected about which of the first call control server and the second call control server is an active server and accesses a returned call control server.

10. The voice communication system according to claim 8, wherein, when communication between the first and second server systems is interrupted due to a failure in the communication line, the active server maintains the active mode, the standby server switches an operation mode of the standby server to the active mode and starts controlling voice communication, a communication terminal connected to a network on the active server side accesses the active server and performs voice communication with another communication terminal accessing the active server, and a communication terminal connected to a network on the standby server side accesses the standby server entering the active mode and performs voice communication with another communication terminal accessing the standby server entering the active mode.

11. The voice communication system according to claim 10, wherein the first server system further includes a first management server including a management table storing operating status of the first and second call control servers, and the second server system further includes a second management server including a management table storing operating status of the first and second call control servers, each of the first call control server and the second call control server periodically transmits the operation notification being a message notifying that the call control server is operating normally, to the first management server and the second management server, the first or second call control server transmits, when switching an operation mode of the call control server from the standby mode to the active mode, a mode switch notification being a message notifying the switching, to the first management server and the second management server, each of the first management server and the second management server stores operating status of each call control server acquired by the operation notification and the mode switch notification into the management table, and the communication terminal inquires of a management server on a network to which the communication terminal is connected about which of the first call control server and the second call control server is an active server and accesses a returned call control server.

12. The voice communication system according to claim 1, wherein the first server system further includes a first management server including a management table storing operating status of the first and second call control servers, and the second server system further includes a second management server including a management table storing operating status of the first and second call control servers, each of the first call control server and the second call control server periodically transmits the operation notification being a message notifying that the call control server is operating normally, to the first management server and the second management server, the first or second call control server transmits, when switching an operation mode of the call control server from the standby mode to the active mode, a mode switch notification being a message notifying the switching, to the first management server and the second management server, each of the first management server and the second management server stores operating status of each call control server acquired by the operation notification and the mode switch notification into the management table, and the communication terminal inquires of a management server on a network to which the communication terminal is connected about which of the first call control server and the second call control server is an active server and accesses a returned call control server.

13. A method of providing call control server redundancy, the method comprising:

in a voice communication system including a first server system being installed on a first network and including a first call control server, a second server system being installed on a second network and including a second call control server, and a communication line connecting the first server system and the second server system and being different from the first and second networks, during normal operation when communication through the communication line can be performed, causing the first call control server to operate in an active mode actually providing call control service and causing the second call control server to operate in a standby mode that, when the first call control server in the active mode goes down, becomes the active mode in place of the first call control server; and, during a failure when the communication line is down, causing the second call control server to operate in the active mode along with the first call control server.

14. The method of providing call control server redundancy according to claim 6, wherein the first call control server in the active mode periodically transmits the operation notification being a message notifying that the first call control server is operating normally, to the second call control server in the standby mode, and the second call control server continues the standby mode while periodically receiving the operation notification from the first call control server and switches an operation mode of the second call control server from the standby mode to the active mode when no longer receiving the operation notification from the first call control server.

15. The method of providing call control server redundancy according to claim 14, wherein the first server system further includes a first management server, and the second server system further includes a second management server, each of the first call control server and the second call control server periodically transmits the operation notification to the first and second management servers and when an operation mode of the call control server switches from the standby mode to the active mode, transmits a mode switch notification being a message notifying the switching, to the first and second management servers, and each of the first and second communication terminals inquires of a management server on a network connectable by the communication terminal about which of the first call control server and the second call control server is an active server and accesses a call control server returned as the active server.

16. The method of providing call control server redundancy according to claim 6 or 7, wherein the voice communication system further includes a first communication terminal connectable to the first network and a second communication terminal connectable to the second network, during the normal operation, the first communication terminal accesses the first call control server in the active mode through the first network and the second communication terminal accesses the first call control server in the active mode through the second network and the communication line, and during the failure, the first communication terminal accesses the first call control server in the active mode through the first network and the second communication terminal accesses the second call control server in the active mode through the second network.

17. The method of providing call control server redundancy according to claim 7, wherein the voice communication system further includes a first communication terminal connectable to the first network and a second communication terminal connectable to the second network, during the normal operation, the first communication terminal accesses the first call control server in the active mode through the first network and the second communication terminal accesses the first call control server in the active mode through the second network and the communication line, and during the failure, the first communication terminal accesses the first call control server in the active mode through the first network and the second communication terminal accesses the second call control server in the active mode through the second network.

18. The method of providing call control server redundancy according to claim 17 wherein the first server system further includes a first management server, and the second server system further includes a second management server, each of the first call control server and the second call control server periodically transmits the operation notification to the first and second management servers and when an operation mode of the call control server switches from the standby mode to the active mode, transmits a mode switch notification being a message notifying the switching, to the first and second management servers, and each of the first and second communication terminals inquires of a management server on a network connectable by the communication terminal about which of the first call control server and the second call control server is an active server and accesses a call control server returned as the active server.

19. The method of providing call control server redundancy according to claim 16, wherein the first server system further includes a first management server, and the second server system further includes a second management server, each of the first call control server and the second call control server periodically transmits the operation notification to the first and second management servers and when an operation mode of the call control server switches from the standby mode to the active mode, transmits a mode switch notification being a message notifying the switching, to the first and second management servers, and each of the first and second communication terminals inquires of a management server on a network connectable by the communication terminal about which of the first call control server and the second call control server is an active server and accesses a call control server returned as the active server.

20. The method of providing call control server redundancy according to claim 13, wherein the first server system further includes a first management server, and the second server system further includes a second management server, each of the first call control server and the second call control server periodically transmits the operation notification to the first and second management servers and when an operation mode of the call control server switches from the standby mode to the active mode, transmits a mode switch notification being a message notifying the switching, to the first and second management servers, and each of the first and second communication terminals inquires of a management server on a network connectable by the communication terminal about which of the first call control server and the second call control server is an active server and accesses a call control server returned as the active server.

\* \* \* \* \*